June 29, 1937.  H. E. TAUTZ  2,085,235

WORKHOLDER FOR SHAPERS

Filed Feb. 19, 1936  2 Sheets-Sheet 1

WITNESSES
L. E. Kilian
C. L. Waal

INVENTOR
Herbert E. Tautz
By R. S. Caldwell
ATTORNEY

June 29, 1937.  H. E. TAUTZ  2,085,235
WORKHOLDER FOR SHAPERS
Filed Feb. 19, 1936  2 Sheets-Sheet 2
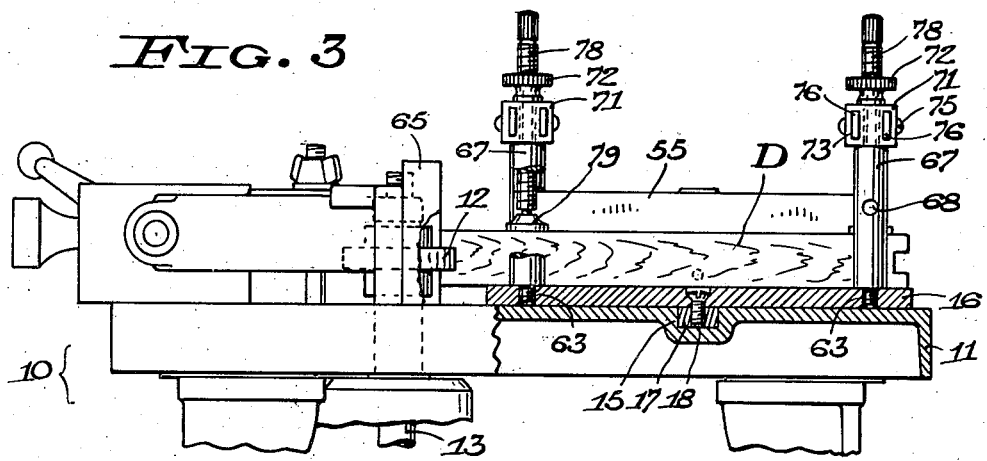
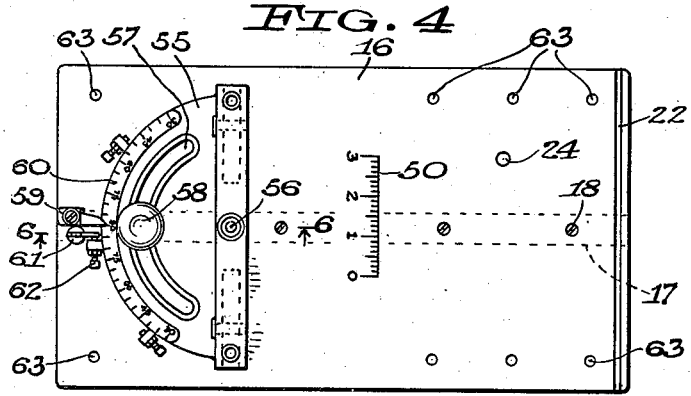
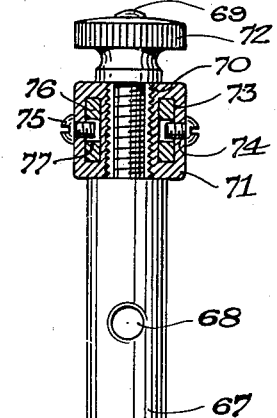
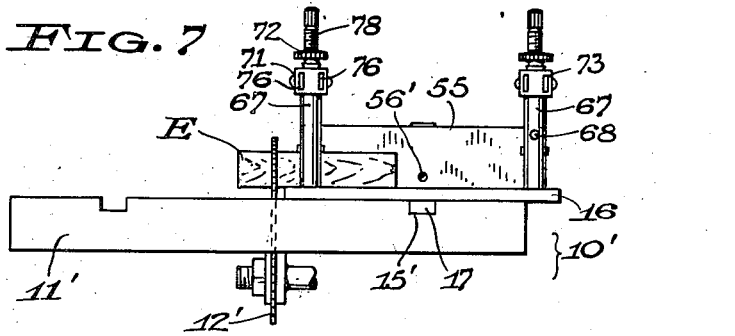
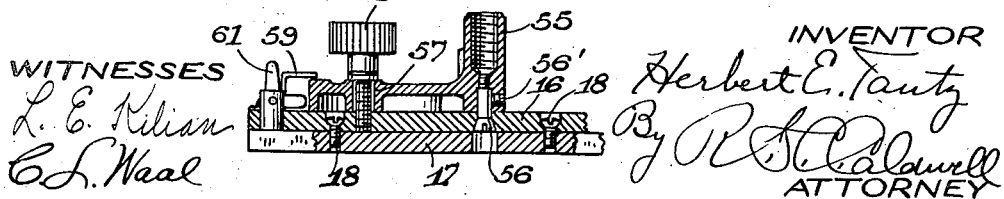
INVENTOR
Herbert E. Tautz
By R. S. Caldwell
ATTORNEY
WITNESSES
L. E. Kilian
C. L. Waal Patented June 29, 1937

2,085,235

UNITED STATES PATENT OFFICE 2,085,235

WORKHOLDER FOR SHAPERS

Herbert E. Tautz, Milwaukee, Wis., assignor to The Delta Manufacturing Company, Milwaukee, Wis., a corporation of Wisconsin Application February 19, 1936, Serial No. 64,610

3 Claims. (Cl. 144—253)

The invention relates to work holders for shapers, saws, and other machine tools.

The shaping of a work-piece on end grain has been a somewhat dangerous operation, especially to an inexperienced operator, and particularly in the case of a narrow piece or small block. The work, having little or no bearing against the shaper fence, is apt to be deflected by the cutter during the forward and return strokes of the work, and there is a possibility of the operator's hands being drawn against the cutter. A further disadvantage is that slipping of the work will cause inaccurate cutting and damage to the work. The cutting of narrow or small work-pieces on a circular saw, especially across the grain, is open to similar objections.

It is an object of the present invention to provide a work holder of simple, durable, and inexpensive construction for use on shapers and other machines to enable shaping and other cutting operations to be safely, accurately, and quickly performed, even by inexperienced operators.

Another object of the invention is to provide a work holder by which the work holder can be presented to the cutter at a selected angle and clamped to the holder near the portion to be cut.

The invention further consists in the several features hereinafter described and claimed.

In the accompanying drawings illustrating certain embodiments of the invention,

Fig. 3 is an end elevation of the work holder and shaper, parts being broken away and parts being shown in section;

Fig. 4 is a plan view of a sliding base plate;

Fig. 5 is a detail sectional view taken on the line 5—5 of Fig. 1;

Fig. 6 is a detail sectional view taken on the line 6—6 of Fig. 4, and

Fig. 7 is an end elevation of the work holder applied to a circular-saw machine.

Figure 1:
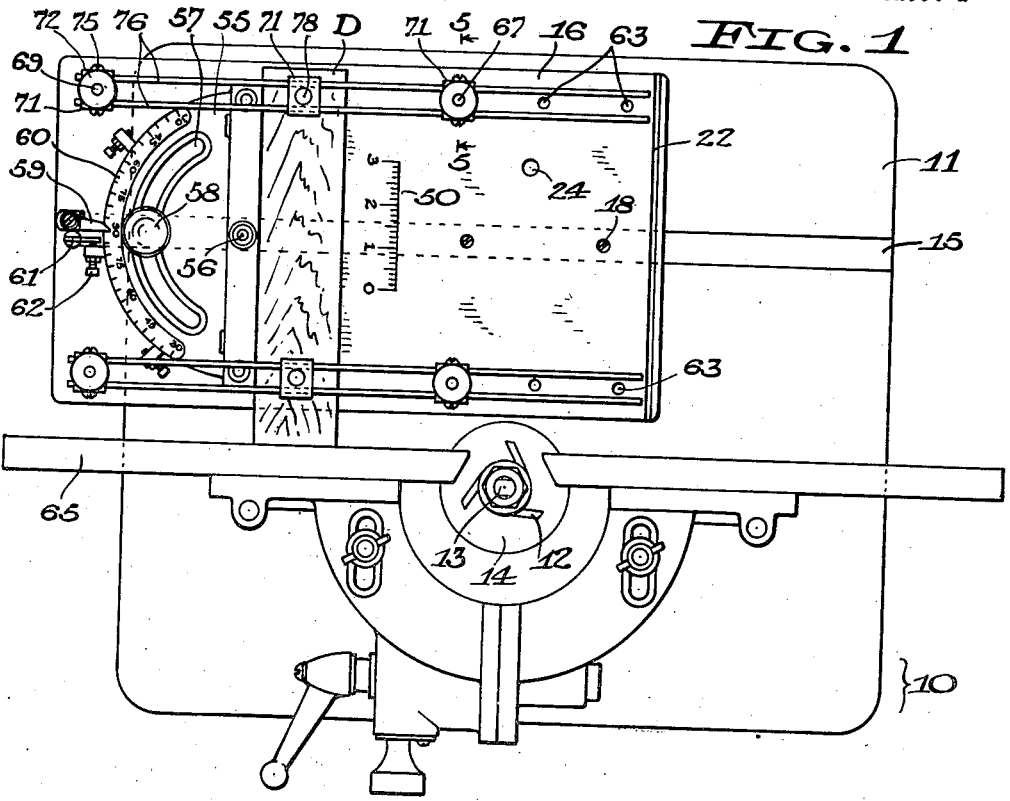
Fig. 1 is a top plan view of a work holder constructed in accordance with the invention, applied to a spindle shaper.
Figure 2:
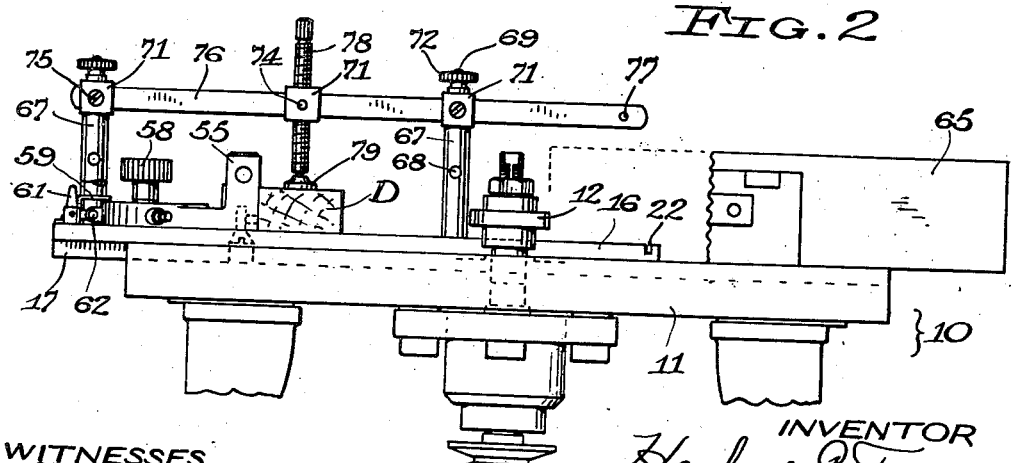
Fig. 2 is a side elevation of the work holder and spindle shaper, parts of a shaper fence being broken away.

In the form of the invention shown in Figs. 1 to 6, 10 designates a wood-working machine having a table 11 and a cutter 12. The machine is here exemplified by a spindle shaper, the cutter 12 thereof being carried on a suitably mounted belt-driven spindle 13 projecting vertically through an apertured table insert 14, and the table top being provided with a guideway or groove 15.

A suitable cutter-guarding and work-guiding fence 65 is adjustably secured to the table and may be similar to that shown in my United States Letters Patent No. 1,947,885 for Work guide, issued February 20, 1934.

A flat rectangular metal base plate 16 slidably rests on the table top, and a guide bar or key 17 is secured, as by screws 18, to the flat bottom face of the base plate. The guide bar 17 slidably fits in the guideway 15 of the table so as to confine the base plate in a longitudinal path of travel past the cutter. One side edge of the base plate is adjacent a tangential plane of the cutter. The flat top face of the base plate is above and parallel to the table top.

The base plate is provided near its front portion with a miter gage head 55 which is swingably secured to the base plate by a pivot screw 56 held in place by a set screw 56' in the head, the miter gage head being slidable on the flat top face of the base plate, and the pivot screw 56 being located substantially in the longitudinal medial line of the base plate and being perpendicular to the plate. The miter gage head has an arcuate slot 57 concentric with the pivot screw and receiving therethrough a clamping thumbscrew 58. A pointer 59 on the base plate cooperates with an angular scale 60 on the miter gage head, and a swingable L-shaped stop member 61 is carried on a stud 61 secured to the bar plate and cooperates with a number of adjustable stop screws 62 on the head for facilitating the positioning of the head to different angular positions. The miter gage may be similar to that shown in my United States Letters Patent No. 1,894,010 for Work holding means for gauges, issued January 10, 1933.

The sliding base plate 16 is adapted to support a work-piece D thereon, the work-piece being positioned by the miter gage head 55 and being brought against the cutter 12 by the advancing travel of the base plate. The base plate is preferably wide enough to extend to or beyond the opposite sides of the miter gage head, so as to protect the latter in all of its angular positions and to provide a broad support for the work piece, the base plate supporting the work-piece above and out of contact with the table top.

The base plate is provided with a number of tapped holes 63 near its opposite side edges to detachably receive therein the reduced threaded lower ends of posts or rods 67 forming parts of work-clamping means. Each post has a transverse opening 68 to receive a suitable turning tool, not shown, for tightening and loosening the post. The upper end of each post has a reduced threaded stem 69 which slips through a vertical bore 70 in a rectangular metal block 71. If desired, the blocks 71 may be of die-cast construction. A thumb-nut 72 on the threaded stem 69 clamps the block to the post. Each block 71 is provided with a pair of parallel slots or openings 73 arranged on opposite sides of the bore 70 and both opening at opposite side faces of the block, and is further provided at other opposite sides with tapped openings 74 to receive screws 75. The pair of spaced posts near each side of the base plate are connected by a pair of spaced parallel bars or straps 76 which slidably extend through the slots 73 in the blocks 71. The bars are secured to the blocks by the screws 75 which either extend into openings 77 formed in the bars (Figs. 2 and 5), or engage the outer faces of the bars, so as to lock the bars against longitudinal shifting. One or more additional blocks 71 are slidably mounted on each pair of the bars 76, the bore 70 of each block being screw-threaded to receive therethrough a clamping thumb-screw 78 which carries a swiveled clamping head or button 79 at its lower end engageable with the upper face of the work-piece D. As seen in Figs. 1 and 3, one of the clamping screws 78 is near that end of the work-piece which is to be presented to the cutter, so as to insure firm clamping of the work. This is particularly important with thin and narrow work-pieces, and also with short block-like work-pieces. The work-piece D, when of sufficient length, is clamped by the clamping screws near both sides of the base plate. For clamping a wide work-piece, additional clamping screws may be mounted on the bars. The stems 69 of the posts 67 are of smaller diameter than the thumb-screws 78, so as to slip through the screw-threaded bores 70 in the blocks 71. If desired, the blocks for the thumb-screws 78 may also be provided with the screws 75, but this is not essential. The posts 67 at the front portion of the base plate are placed at a sufficient distance in front of the pivotal axis of the miter gage head to avoid interference with the work when the miter gage head is swung to different angular positions.

In the disclosure of my companion application for Work holders for saws, Serial No. 64,611, filed February 19, 1936, the same base plate 16 is used in conjunction with another form of work clamping means, and for this purpose the base plate is provided with a transverse guide groove 22, a tapped opening 24, and a scale 50.

In Fig. 7, the work holder is shown applied to a circular-saw machine 10' having a table 11' through which projects a saw blade 12'. The base plate 16 of the work holder slidably rests on the table 11', the key 17 of the base plate slidably fitting in a guideway or groove 16' formed in the table top. A work-piece E is clamped on the work holder, and is fed past the saw by moving the work holder along the table. One edge of the base plate is near the plane of the saw and one of the clamping screws 78 is also near this plane.

In setting up the apparatus for shaping, the base plate 16 is mounted on the shaper table 11 to slide thereon, and the clamping devices are mounted on the base plate. The miter gage head is set to a desired angle and the work-piece D is rested against the base plate and miter gage head and is clamped in position by one or more of the clamping screws 78. If desired, the work-piece may be abutted against the fence 65 to determine the depth of cut.

In operation, the shaping cutter 12 is driven from any suitable source of power, not shown, and the operator pushes the work holder along the table to bring the clamped work-piece against the cutter, thus imparting a predetermined shape to the end edge of the work-piece. The work holder is then retracted, and the work-piece is released. If the other end of the work-piece is to be similarly shaped, the work-piece is turned end for end and reclamped to the holder.

The work holder is particularly useful for the shaping of end grain, and avoids the dangerous practice of manually holding small and narrow work-pieces on the table for presenting them to the cutter. Moreover, the firm clamping of the work-piece insures accuracy and avoids damage to the work-piece.

When the work-piece E of Fig. 7 is to be presented to the saw, it is clamped to the base plate and is positioned by the miter gage head. The operator pushes the work holder along the table to bring the clamped work-piece against the saw, and then retracts the work holder. Since one side edge of the base plate is adjacent the plane of the saw and one of the work clamps is also adjacent such plane, a short work-piece can readily be clamped and safely presented to the saw.

What I claim as new and desire to secure by Letters Patent is:

1. A work holder for a machine tool having a cutter and a table with a guideway, comprising a base plate to slidably rest on said table and having a guide portion engageable with said guideway, said base plate having a flat work-supporting top surface extending above the table top, and a miter gage head pivotally mounted on said base plate, the opposite side edges of said plate extending to at least the opposite sides of said miter gage head, and the opposite ends of the work-engaging portion of said head bearing on said base plate and extending substantially equal distances from the pivotal axis of the head.

2. Work-holding means comprising a rigid member having a pair of spaced parallel openings therethrough and having opposite side walls at least one of which is provided with an aperture, bars extending into said openings, a locking member in said aperture engageable with at least one of said bars, and work-clamping means adjustable along said bars.

3. A work holder for a machine tool having a cutter and a table with a guideway, comprising a work-supporting base plate to slidably rest on the table and having a guide portion engageable with said guideway, a miter gage pivotally secured to said base plate approximately midway between the opposite side edges of said plate and extending toward said opposite side edges, bars supported by and above said base plate adjacent the opposite side edges of the plate, and work-clamping members adjustable along said bars.

HERBERT E. TAUTZ.